Jan. 24, 1961   J. R. McDOUGALL   2,968,875
DEVICE FOR COMPARING DATA WITH STANDARD INFORMATION
Filed Feb. 28, 1958   3 Sheets-Sheet 1
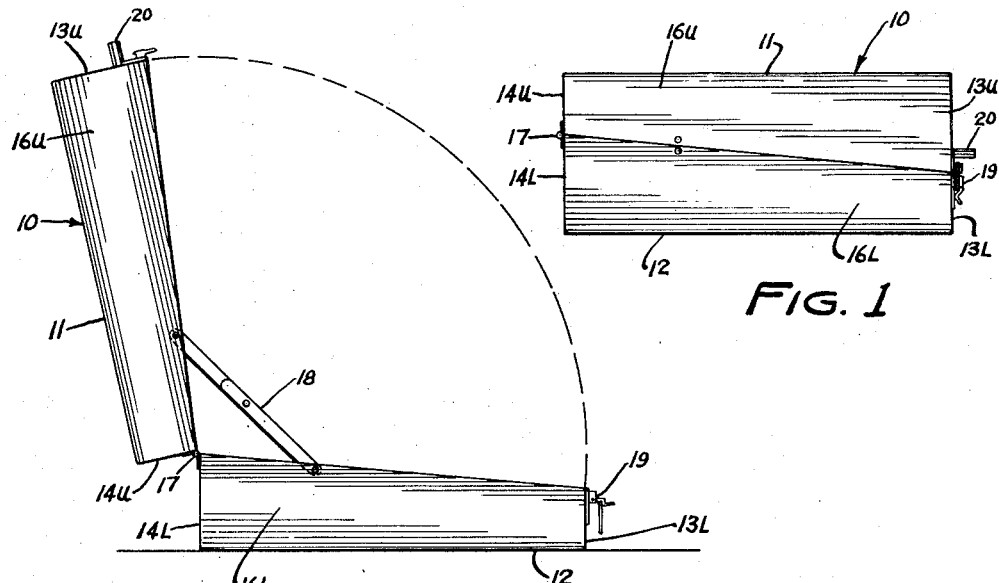
FIG. 1
FIG. 2
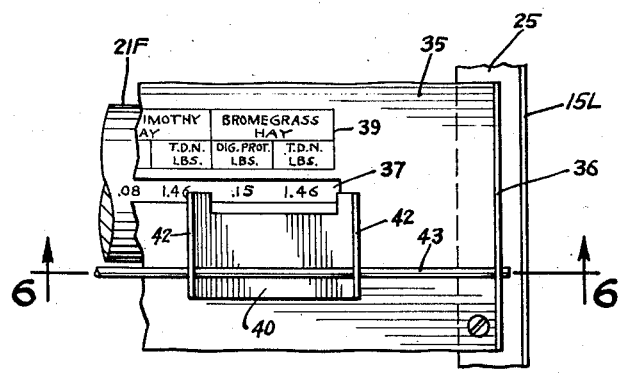
FIG. 5
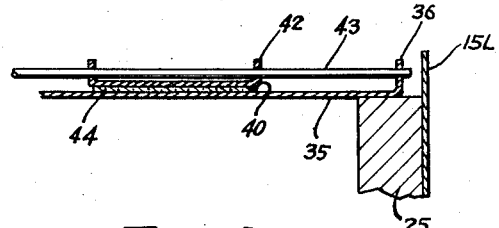
FIG. 6
INVENTOR.
JAMES R. McDOUGALL
BY Moore, White & Burd
ATTORNEYS Jan. 24, 1961   J. R. McDOUGALL   2,968,875
DEVICE FOR COMPARING DATA WITH STANDARD INFORMATION
Filed Feb. 28, 1958   3 Sheets-Sheet 2
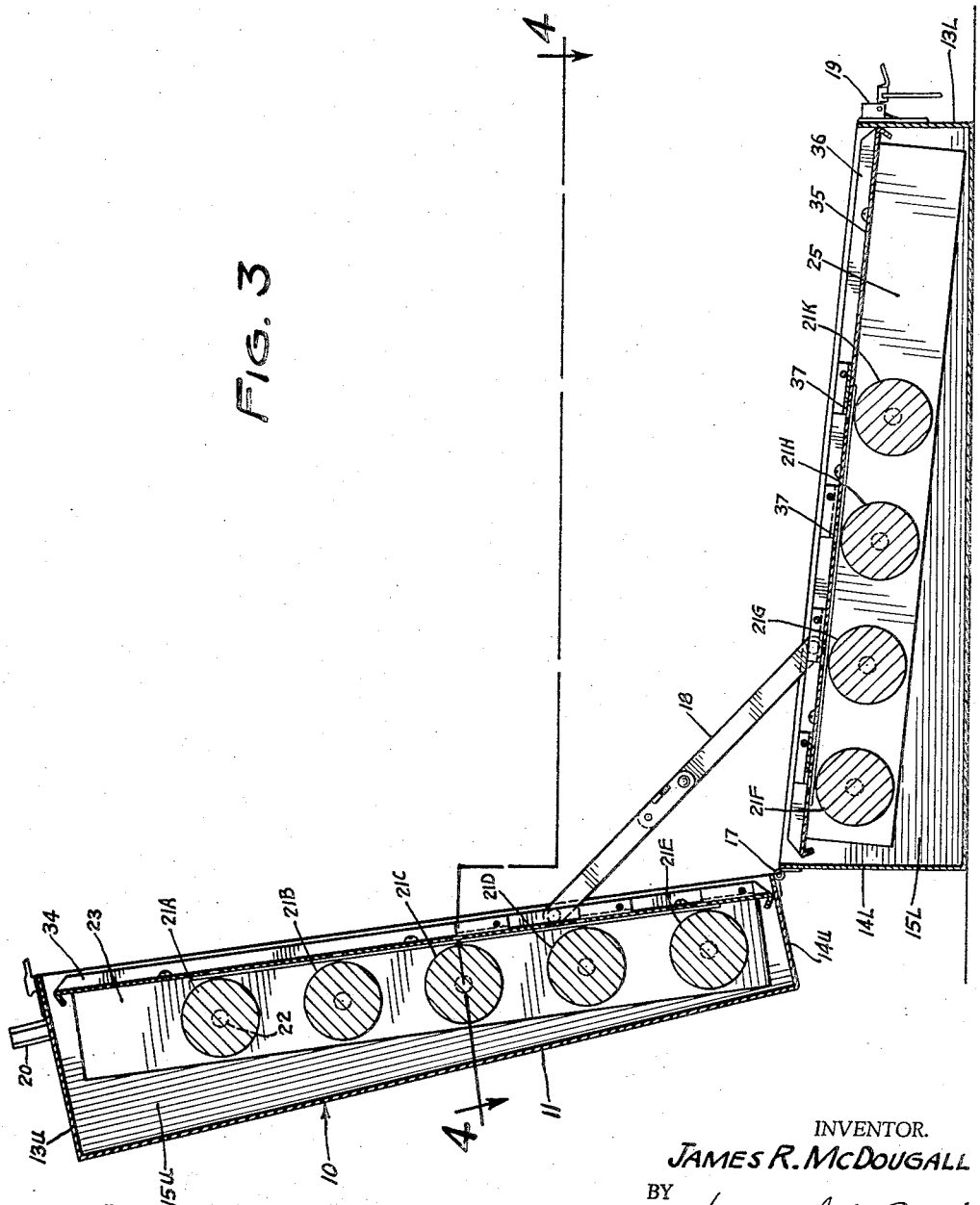
INVENTOR.
JAMES R. McDOUGALL
BY
ATTORNEYS Jan. 24, 1961  J. R. McDOUGALL  2,968,875
DEVICE FOR COMPARING DATA WITH STANDARD INFORMATION
Filed Feb. 28, 1958  3 Sheets-Sheet 3

INVENTOR.
JAMES R. McDOUGALL
BY
*Moore, White & Burd*
ATTORNEYS

United States Patent Office 2,968,875
Patented Jan. 24, 1961

2,968,875

DEVICE FOR COMPARING DATA WITH STANDARD INFORMATION

James R. McDougall, Minneapolis, Minn., assignor to Nutrena Mills, Inc., Minneapolis, Minn., a corporation of Kansas Filed Feb. 28, 1958, Ser. No. 718,209

5 Claims. (Cl. 35—1)

This invention relates to a calculator for comparing two or more sets of indicia or values for quickly and easily determining the relationship between given conditions or materials and accepted norms for those same conditions or materials and calculating the added values necessary to bring the given conditions or materials up to the accepted norms, if they are deficient. More particularly, this invention relates to a portable manual calculator for comparing the normal feed for beef and dairy cattle, sheep, and like livestock with indicia or values representing the accepted ideal daily nutrient requirements for those animals in order that it may be quickly and easily determined whether the normal feed meets the accepted ideal requirements, and, if not, to easily and readily calculate the amount of feed supplement necessary to be added to bring the normal feed up to the accepted ideal.

It is generally accepted that the natural feed available to stockmen for feeding to their stock, such as hays, grain, silage, other green roughages, and the like, is inadequate to provide an ideal balanced ration for livestock. Recognizing this, it has become the accepted practice among progressive and commercial raisers of livestock to supplement the natural diet of their stock with commercial feeds containing concentrated nutrients, such as proteins, vitamins, minerals, etc., in order to provide the livestock with an enriched balanced diet. By extensive experimentation through the years by various governmental and educational agencies, it has been possible to establish minimum and optimum daily nutrient requirements for livestock of various species, ages, utility and the like.

It has been well demonstrated that rigid control of diet is economically profitable for the stockman by upgrading his stock, by increasing its marketable weight, by reducing the time required to make the stock ready for market, and the like. At the same time, it has been relatively difficult for the average stockman to evaluate the natural feed available to him and to compare this with the accepted ideal requirements for his stock in order to determine what supplementation is required. If the supplements are added in insufficient amounts, the result will be less than ideal, but, on the other hand, over supplementation is wasteful. For that reason, it is in the economical interest of the stockman to be able to determine as accurately as possible the enrichment which the normal feed of his livestock requires.

It is the principal object of this invention, therefore, to provide a simple, portable, manually operable calculator provided with indicia by which the nutrient values of the available natural feed can be quickly and easily compared with the accepted ideal requirements so that the amount of needed supplementation may be readily determined.

It is another object of this invention to provide a calculator by which the nutrient values of available feeds may be compared with accepted ideal daily nutrient requirements in order to determine the amount of supplementation required, which calculator is portable and which is provided with its own carrying case to facilitate its being carried from place to place, as, for example, by the feed dealer or salesman who can thus immediately and visually demonstrate to his stockman customer the amount of enriched feed supplement needed.

It is a still further object of this invention to provide a compact portable, manually operable calculator by which other indicia and values may be compared to make other desired determinations as particular conditions and circumstances may warrant.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 1 is a side elevation of the calculator according to this invention showing the carrying case closed;

Figure 2 is a similar side elevation showing the carrying case open;

Figure 3 is a somewhat enlarged vertical side elevation, in section, with the carrying case open as in Figure 2;

Figure 5 is a somewhat enlarged fragmentary plan view showing in greater detail the arrangement of indicia and structure of the calculator; and Figure 6 is a vertical section taken on the line 6—6 of Figure 5 and in the direction of the arrows.

Figure 4:
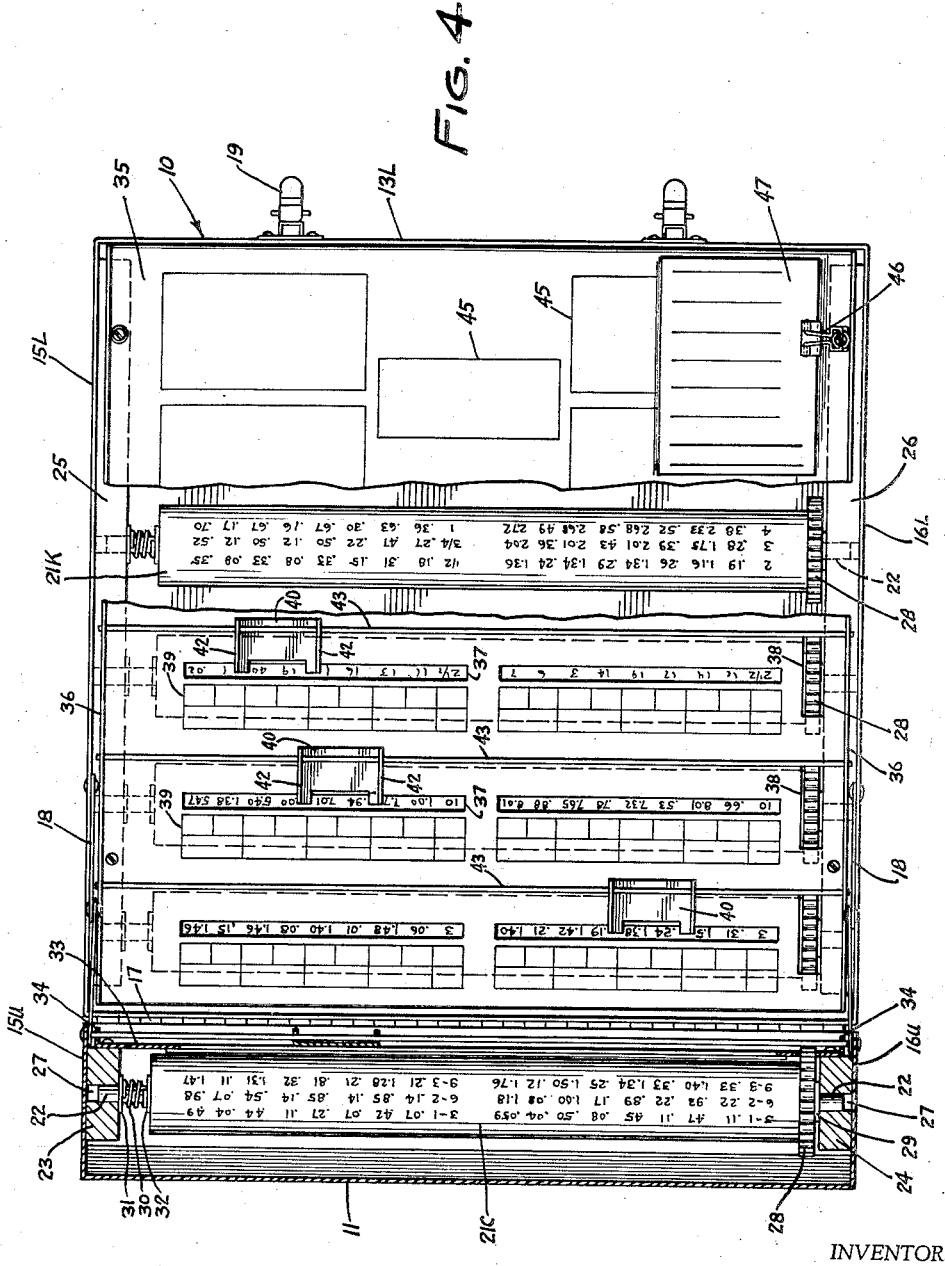
Figure 4 is a plan view, partly in section, and partly broken away, on the line 4—4 of Figure 3 and in the direction of the arrows.

Referring to the drawings, the carrying case, indicated generally at 10, comprises a box in the form of a rectangular parallelepiped having a top 11; a bottom 12; front wall composed of a rectangular upper portion 13U and a rectangular lower portion 13L, a back wall composed of a rectangular upper portion 14U and a rectangular lower portion 14L, one end wall composed of a pair of upper and lower trapezoidal elements 15U and 15L which, when fitted together, form a rectangle, and another side wall composed of an upper trapezoidal element 16U and a lower trapezoidal element 16L, which when fitted together form a rectangle of similar size and shape. The case may be made of any suitable material such as plywood, sheet metal or the like.

The parting lines between the panels which make up the front, back and side walls of the carrying container lie generally in a plane which is inclined upwardly from the front toward the back of the case. The back wall panels 14U and 14L are joined by hinge means 17 to permit the carrying case to be opened, as shown in Figure 2. A pair of pivoted links 18, one end of each of which is pivotally secured to the inside of one of the opposite side wall panels, limits the extent to which the carrying case may be opened, as illustrated. The front wall panels 13U and 13L are provided with a pair of like snap fastening means 19 for securing the carrying case in its closed position. A handle 20 is also provided, centrally located on the front wall of the container, to facilitate carrying.

A plurality of rollers 21A, 21B, etc., are journalled for rotation in both the top and the bottom sections of the carrying case with their axis disposed in parallel relationship. Each of the rollers comprises an elongated cylindrical solid roll or tube mounted on a shaft 22 which projects beyond the ends of the roller and whose ends are journalled in mounting blocks 23—26 secured to the inside side wall surfaces of the carrying case. As illustrated, mounting block 23 is provided with a plurality of holes or sockets 27 for mounting five rollers in the top section of the carrying case and is fastened on the inside surface of the side wall panel 15U parallel to and spaced slightly inwardly from the parting line between the two side wall panels. Mounting block 24 is similarly provided with socket holes and secured to the inside surface of side wall panel 16U.

As also illustrated, the mounting block 25 is provided with sockets 27 for mounting only four rollers and is secured to the inside surface of the side wall panel 15L parallel to and spaced slightly inwardly from the parting line between the two side wall panels. Mounting block 26 is similarly provided and fastened to the inside surface of the opposite side wall panel 16L. The opposite ends of the shafts 22 are fitted into opposed sockets 27 to journal the rollers for rotation. If desired, the sockets 27 may be fitted with bearing structures to receive the end of the shafts 22 but in most instances, it is sufficient if the ends of the shafts merely fit with a loose sliding fit into the sockets.

The rollers may be constructed of any desired material such as wood, metal, synthetic resin, or the like. Likewise, the shafts may desirably be wooden or metal rods and the mounting blocks may be constructed of wood, stamped from metal, molded from synethetic plastic material or the like as desired.

Each roller is provided at one end with a knurled or serrated disc or wheel 28 of somewhat greater diameter than the roller to facilitate manual rotation of each of the rolls. A spacing washer 29 is preferably disposed on each of the shafts between the mounting blocks and the roller turning discs 28. At the opposite ends of each of the shafts, a coil spring 30 fitted between a pair of washers 31 and 32 is disposed around the shaft between the end of the roller and the adjacent mounting block so as to exert slight spring pressure against the roller so as to exert a braking action to prevent rotation of the roller except upon manipulation of the hand turning disc 28.

A relatively thin rigid covering panel or sheet 33 is disposed over the rollers in the upper section of the carrying case and secured to the edge surfaces of the mounting blocks 23 and 24 which are adjacent to the side wall parting lines. The opposed parallel side edges of the cover panel 33 are provided with up-turned flanges 34 for mounting a cursor guide as hereinafter explained. A similar cover panel 35 is mounted in the lower section of the carrying case supported on the edges of mounting blocks 25 and 26. The lower panel is provided with up-turned flanges 36.

The cover panels 33 and 35 are each provided with a plurality of viewing slots or openings 37, each of which directly overlies the surface of one of the rollers. The surfaces of each of the rollers are provided with indicia which is readable through the slots 37. Each of the panels 33 and 35 is provided with additional slots 38 through which a portion of the turning discs 28 protrude to permit easy hand rotation of the respective rollers. The cover panels 33 and 35 are provided with columnar headings 39 adjacent each of the viewing slots 37 for the purpose of identifying the indicia visible through that slot from the roller below.

To facilitate reading of the indicia from the rollers, a cursor 40 is provided on the outside surfaces of the cover panels adjacent to the viewing slots 37. Each cursor is preferably formed of solid opaque sheet material at least partially overlapping one of the viewing slots 37 and is provided with an open viewing area of width just sufficient to embrace the area of the viewing slot and roller surface bearing those indicia desired to be read. Each cursor 40 is provided on its opposite end with an upturned flange 42 having a hole by which it is secured to a cursor guide rod 43 which, in turn, is mounted in the upturned flanges 34 or 36 of the cover panels 33 and 35, respectively.

The cursor is desirably formed from sheet metal, plastic sheet material, or the like, and the guide rod 43 is desirably a relatively stiff wire rod or the like. A felt pad 44 is preferably provided on the under surface of the cursor between the cursor and the covered panels so that the cursors frictionally engage the surfaces of the cover panels and therefore, remain tin place wherever they are set along the length of the guide rods. Space is provided on the lower cover panel 35 for presenting additional data in the form of tables 45. For the convenience of the user of the calculator of this invention, a spring clip 46 is preferably provided to hold a pad 47 for use in making notes and calculations.

In its specific form the calculator of this invention is designed to furnish the stockman or dairyman with the ideal daily nutrient requirements for beef cattle, dairy cattle, sheep or the like for various weights and ages, etc., to furnish him with data with respect to the nutrient content of those natural feeds in most widespread use, and, at the same time, to furnish him with data as to the nutrient values of various commercial feed supplements so that the amount of supplemental feed necessary to bring the natural feed up to the ideal requirement may be readily determined.

As an example, the first two rollers, 21A and 21B, contain data relating to the daily requirements for fattening beef cattle, for wintering beef cattle, for feeding dairy cows, for feeding sheep, etc. For beef cattle and sheep, this data is given with respect to the type of cattle, the average weight, the total feed requirements in pounds, the daily requirements of digestible protein in pounds, the daily requirement in total digestible nutrients in pounds and the like. For dairy cattle, the requirements of total feed, digestible protein and total digestible nutrients are given with respect to the popular breeds and their ability to produce varying pounds of milk daily. The next five rollers 21C–21G give data with respect to the nutrient content of various available natural feed. For example, on roller 21C, may be given data with respect to various green roughages such as pastures of various types, green chopped corn, etc. On roller 21D may be given information with respect to various silages. On rollers 21E and 21F data with respect to dry roughages of various types and on roller 21G data with respect to grains of various types. This data is given as digestible protein and as total digestible nutrients per given weight of foodstuffs for ready correlation with the daily requirements. The remaining two rollers 21H and 21K contain data with respect to the nutrient content of various commercial feed supplements. This information is also given in terms of digestible protein and total digestible nutrient per unit weight of supplement.

The user of this calculator first turns the appropriate upper roller until the appropriate data for his particular type of livestock is visible through the viewing slot 37. This will reveal to him both the total daily feed requirements as well as the specific digestible protein and total digestible nutrient requirements. The cursors are moved along their guide rods to the particular headings which identify the available natural feed being used by the stockman. Depending upon particular circumstances, this may be a single feed material or it may be a mixture of several feedstuffs. The rollers having the informational data for those particular feedstuffs are then rotated by hand and are set at the positions corresponding to the total daily feed requirements of the stock.

In the event several materials are being fed, then the respective dials are set so as to reflect the proportion in which the several materials are fed as well as the total feed. The digestible protein and the total digestible nutrients in the feed being used can then be read directly off the rolls. It is then a simple matter to compare the nutrient values of the feed with the daily requirements. If the feed being used does not come up to the daily requirements, then the rollers containing data wtih respect to various supplemental feeds are rotated until the quantitative values by which the available feed is deficient appear in the viewing window. Then the amount of supplemental feed which must be added can be read directly through the appropriate viewing slot. The amount of supplemental feed necessary for a given number of head of livestock for a particular time period can thus be easily and readily calculated.

It will be readily apparent that the total number of rollers required, the placement of particular data upon the rollers, the placement of the identifying headings, as well as the type of informational data applied, are all subject to wide variations depending upon the particular use to which the calculator is to be put. Although in its specific embodiment illustrated and described in this application, the calculator is used for comparing and determining various feed values, it will be obvious that its utility is not so limited. While it is convenient to have the calculator housed in the portable carrying case, it will be apparent that for some purposes such portability is not necessary. Likewise, depending upon the total number of rollers, it might be more convenient to have all of them in a single section of carrying case instead of distributed between an upper and lower section as illustrated and described.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A portable manually operable calculator comprising in combination a carrying case having top and bottom sections of substantially equal volume hinged together along one adjacent edge, each of said carrying case sections housings a plurality of rollers journalled for rotation, said rollers being supported with their axes parallel on axial shafts extending beyond the end of said rollers and journalled in parallel mounting bars disposed at opposite ends of said rollers on the inside surfaces of the side walls of said carrying case sections, a manually operable disc on each of said rollers for rotating said rollers independently of one another, said disc being of greater diameter than said rollers and co-axial therewith, friction means for retarding the free rotation of said rollers, informational indicia on the surfaces of said rollers, cover panel means overlying said rollers and supported upon said parallel mounting bars, viewing slots in said panel means adjacent each of said rollers to permit viewing of the indicia thereon, informational headings on the exposed surfaces of said panel means adjacent said slots identifying the indicia viewable through the slots from the rollers below, cursor means provided for at least some of said viewing slots to facilitate viewing of indicia therethrough, each of said cursor means at least partially overlying one of the viewing slots and having an open viewing area of length substantially less than the length of said viewing slots, guide means for said cursor parallel to and spaced from said viewing slots, friction means on said cursors for retarding the free longitudinal movement of said cursors along the guide means adjacent their respective viewing slots, and other slots in said panel means overlying said manually operable discs on each of said rollers whereby a portion of the periphery of said disc extends through said slots.

2. A calculator according to claim 1 further characterized in that said means for retarding the free rotation of said rollers comprises a coil spring disposed about the shaft at one end of each roller between the roller and journal mounting bar whereby the opposite end of said roller is urged by spring tension into frictional engagement with the opposite mounting bar.

3. A calculator according to claim 2 further characterized in that the axes of the rollers in the top and bottom sections of said carrying case and the panel cover means in said sections lie in spaced parallel planes inclined downwardly and forwardly from the hinge means connecting said sections.

4. A calculator comprising in combination a plurality of at least three rollers journaled for rotation, said rollers disposed with their axes parallel, means for rotating said rollers independently of one another, friction means for retarding the free rotation of said rollers, informational indicia on the surfaces of said rollers, cover panel means overlying said rollers, viewing slots in said panel means adjacent each of said rollers to permit viewing of the indicia thereon, cursor means provided for at least some of said viewing slots to facilitate viewing of indicia therethrough, each of said cursor means at least partially overlying one of said viewing slots and having an open viewing area of length substantially less than the length of said viewing slots and guide means for said cursor means parallel to and spaced from said viewing slots, and informational headings on the exposed surface of said panel means adjacent said slots identifying the indicia viewed through each slot from the roller below.

5. A calculator according to claim 4 further characterized in that friction means are provided on said cursor means for retarding the free longitudinal movement of said cursor means adjacent their respective viewing slots.

References Cited in the file of this patent

UNITED STATES PATENTS

| | | |
|---|---|---|
| 1,745,674 | Hanna | Feb. 4, 1930 |
| 2,093,530 | Walmsley | Sept. 21, 1937 |
| 2,430,205 | Barry | Nov. 4, 1947 |
| 2,685,748 | Gilbert | Aug. 10, 1954 |